United States Patent Office 3,528,220
Patented Sept. 15, 1970

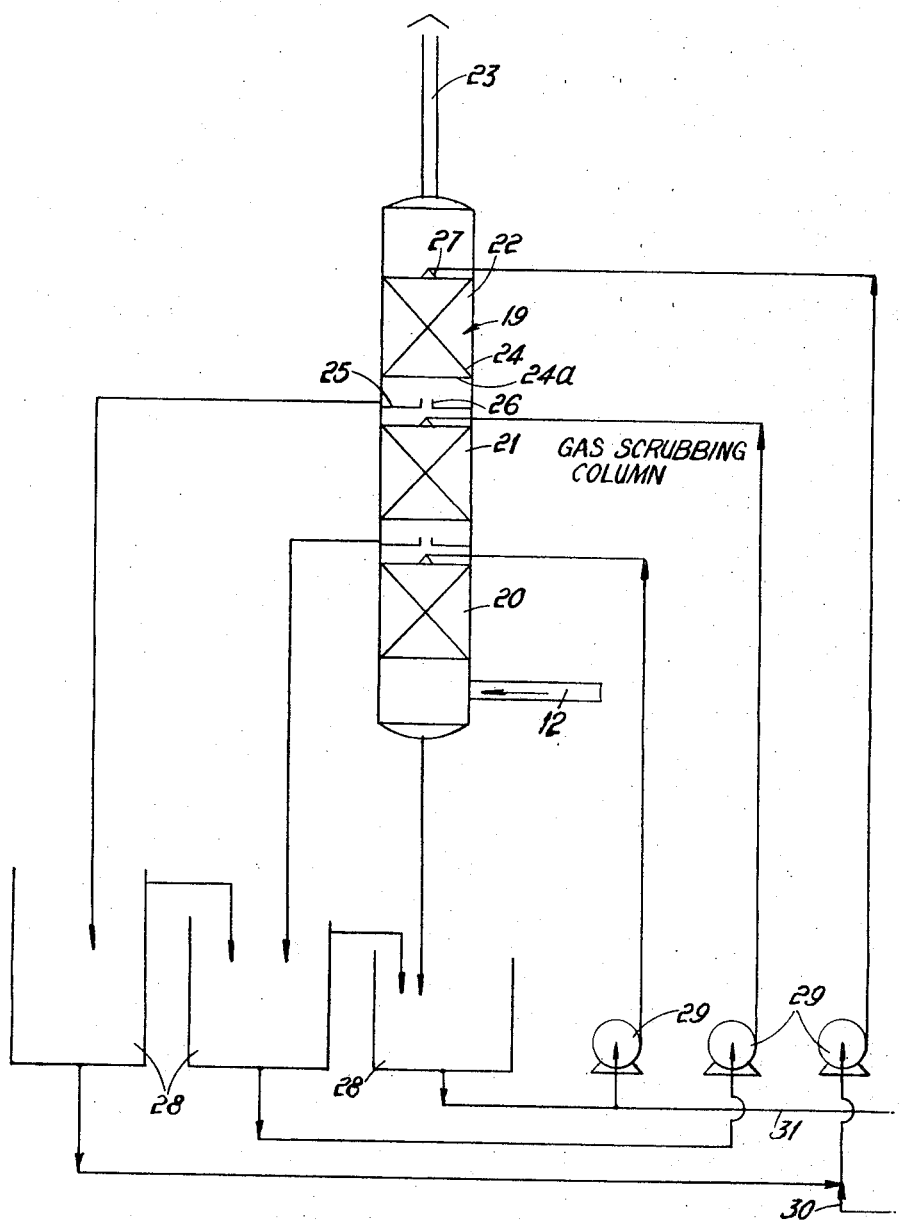

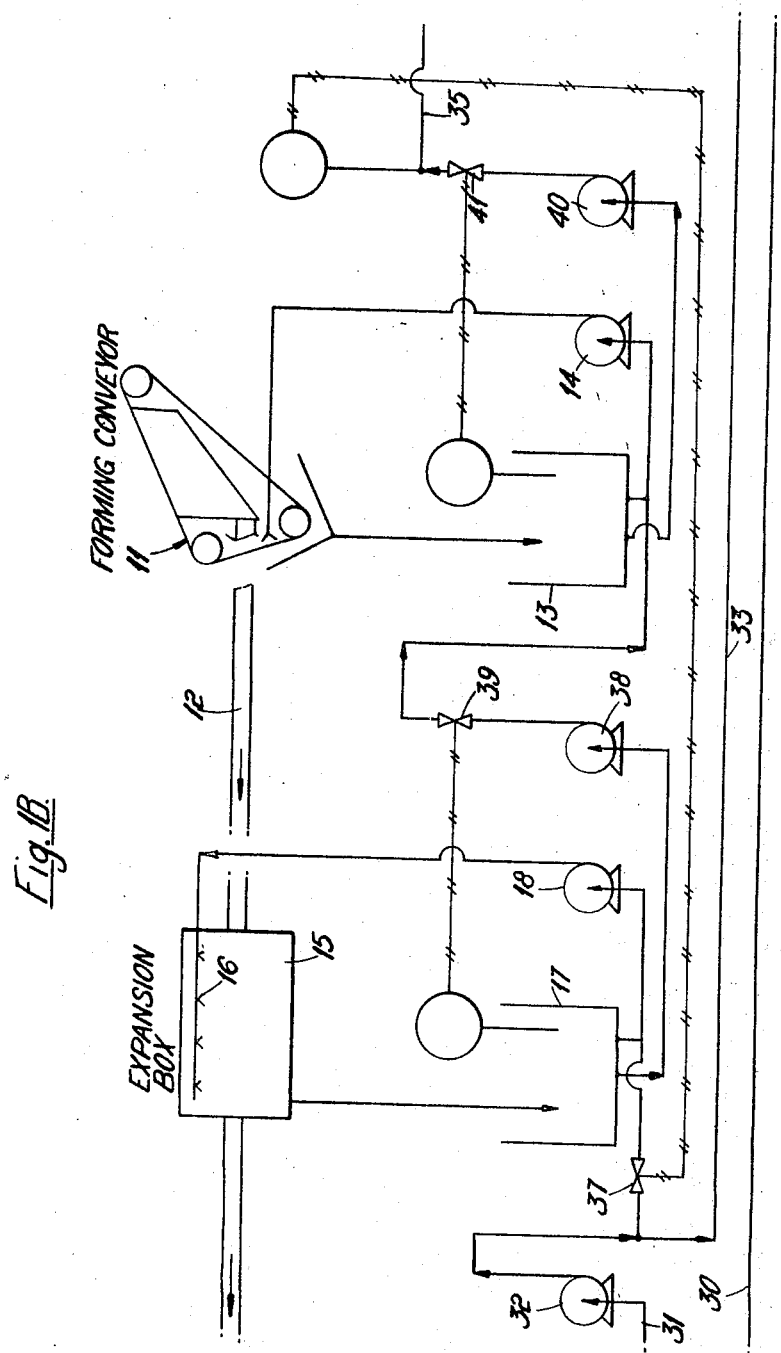

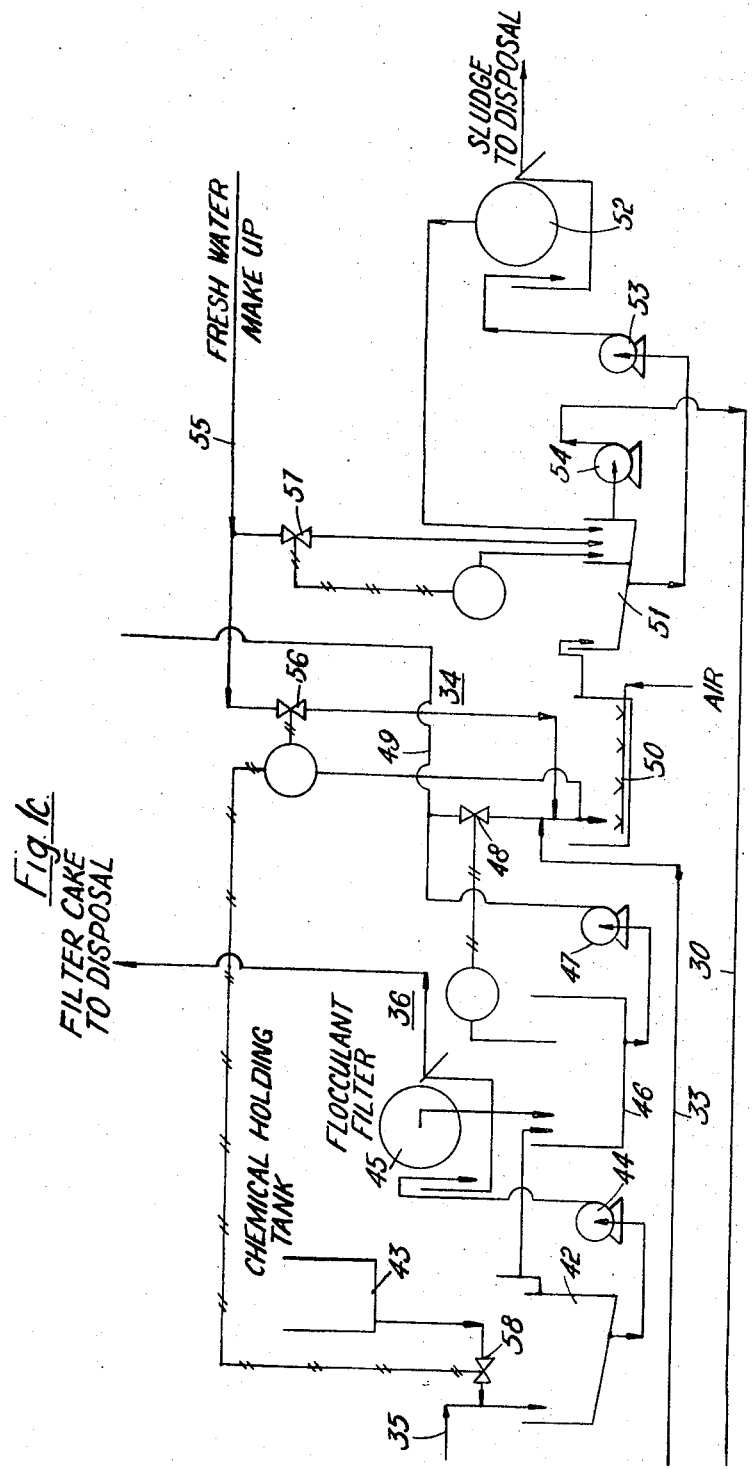

3,528,220
AVOIDANCE OF AIR POLLUTION IN THE MANUFACTURE OF GLASS FIBRE PRODUCTS
Frederick E. Warner and Alexander P. Rice, London, England, assignors to Fibreglass Limited, St. Helens, Lancashire, England, a British company
Filed June 18, 1968, Ser. No. 738,053
Claims priority, application Great Britain, Aug. 21, 1967, 38,490/67
Int. Cl. B01d 47/12
U.S. Cl. 55—89         8 Claims

ABSTRACT OF THE DISCLOSURE

In removing phenolic air pollutants in the production of glass fibre products, the polluted air is passed sequentially through at least two low energy contacting zones in each of which it is contacted with descending scrubbing liquor, each succeeding contacting zone having at its bottom individual liquor collecting means. In passing from one contacting zone to the next zone the air stream undergoes acceleration in a transfer passage in which no interzone flow of liquor occurs, and then impinges on baffle means disposed in its path as it enters the next zone at a level above the pool of scrubbing liquor collected at the bottom of the next zone in the liquor collecting means.

DESCRIPTION OF INVENTION

This invention relates to processes for the formation of glass fibre products and more specifically to control of atmospheric pollution resulting from such processes.

In the large scale manufacture of glass fibre products such as thermal insulation materials, a random deposition of the glass fibre onto a conveyor is carried out in the presence of a spray of an organic resin binder. The particular orientations of the glass fibre "spinners" and the organic resin sprays are such that the glass fibres depositing on the conveyor are substantially coated with the organic resin binder which is subsequently cured by heat. The whole process is conducted in a flow of air which carries the glass fibres and the resin spray droplets onto the moving conveyor. This air is well above ambient temperature due to the fact that the "spinners" which produce the fibres by extrusion of molten glass have to be kept red hot. The hot air, laden with unused organic binder material, passes through the conveyor mesh and the associated ducting and fan system, and is finally discharged to the external atmosphere. Also there is a discharge of fumes evolved in the resin-curing oven.

Many different organic resin formulations may be employed in such a process. For the more common products accounting for the major part of output in large factories, resin binders based on phenol-formaldehyde condensation products, usually but not exclusively in the so-called "resole" form, are still the preferred materials. The materials have many advantages among which is the compatibility of resoles with water in which they are soluble. On the other hand, the use of phenol-formaldehyde systems seriously aggravates the problem of atmospheric pollution because of the toxicity and the acrid odour of the fumes, which are perceptible to smell at very low concentration.

A variety of methods have been tried to remove the phenolic pollutants from the discharge air streams. Hitherto, none of the methods has proved acceptable either on efficiency of collection of the pollutants or on economic feasibility on the large scale.

Consideration of the resin binder formulation, its method of application and the general mechanics of the manufacturing process as a whole shows that the pollution of the outgoing air streams is due to two co-existing factors; firstly the presence of particulate material in the form of liquid droplets ranging in size from some scores of microns diameter down to sub-micron aerosol particles; and secondly the presence of vapours, in particular phenol vapour and to a lesser extent formaldehyde vapour. Failure to understand properly the true nature of the pollution in the air streams is believed to account for the unsatisfactory results obtained hitherto in trying to reduce the degree of pollution to a harmless and undetectable level.

It will be apparent that the time factors appropriate to the efficient removal of particulate material are generally much shorter than those required by absorption from the vapour phase into a liquid system. For particulate removal a high energy scrubbing system is required to obtain effective performance when particle size is very small. This implies high air velocities and short contact times, so that vapour absorption is negligible. Furthermore, the high energy input results in a rise in temperature and thus in the equilibrium vapour pressure over the aqueous scrubber liquors, so establishing a lower concentration of the volatile pollutants in the final liquor discharge.

On the other hand, the conventional low energy scrubbing systems are less effective in the removal of very small particulate pollution, and in order to provide a sufficiently long vapour-liquid contact time, the equipment has to be very large and expensive. Furthermore, running costs are high due to pressure drop and to the high liquid-to-vapour ratios necessary to maintain low phenolic concentrations in the scrubber liquors. It is possible to overcome the last objection by using sodium carbonate or hydroxide as the scrubbing liquor, thus retaining the pollutants in solution as the respective sodium phenates etc. This is only justifiable when the actual quantities of phenolic substances removed from the air stream are such that recovery on a commercial basis is feasible. Such conditions do not apply in the case we are considering specifically, namely the production of glass-fibre products.

It is an object of the present invention to achieve a technique for the removal of phenolic air pollutants in the production of glass fibre products which takes full account of the two factors in the polluting content.

According to the invention, the polluted air is passed sequentially through two or more low energy contacting zones separated by intermediate collecting means such that in passing from one contacting zone to the next the air stream undergoes acceleration and then impinges on baffle means disposed in its path.

The contacting zones may comprise vertical columns of cylindrical or other appropriate shape with internal packing or other fitments to provide a high ratio of wetted surface area to air flow and a substantially controlled path of flow for the air so that the passage of the air is accomplished without excessive pressure drop. The internal packing can be continuously wetted by means of water sprays situated above and so disposed that all parts of the contacting surfaces are washed substantially uniformly.

In the preferred form, the contacting liquid is collected in a tray at the base of the column, whence it can be either wholly or partially recirculated by way of an intermediate collecting tank and pump. The air stream is introducted at the base of the column by means of vertical chimneys passing through the liquid collecting tray, and sealed to the tray so that the liquid cannot pass down. Above the upper ends of the inlet chimneys baffle plates are disposed so that by impingement and deflection of the air stream particulate matter carried by the air may be both deposited and also brought into contact with liquid cascading from the edges of the baffle plates.

It is convenient to arrange that the several contacting zones, preferably three in number and generally as described, are disposed one above the other vertically. Air leaving the top of the first contacting zone then passes directly, by way of the chimneys or risers referred to above into the lower end of the second contacting zone and so on. This arrangement eliminates the need for interconnecting ducting to convey the air from one stage of the process to the next, thus reducing the overall pressure drop and the energy absorbed in the operation of fans, ejectors or other equipment for maintaining a controlled flow of air through the whole system. A further advantage of this arrangement is that the complete assembly becomes self-supporting within a single vertical column requiring the minimum of ground space. However, when site conditions permit, each of the contacting zones complete with its liquor-collecting tray and gas inlet devices may, if desired, be a separate unit suitably connected to the others by ducting so that the air passes sequentially into the base of the first unit, from the top of the first unit to the base of the second unit and so on, finally discharging from the top of the last unit. In either arrangement, as will be apparent, the flows of air and of scrubbing liquors are counter-current each to each.

An important aspect of the invention is that the liquor circulating in any one contacting zone of the system may be independently controlled as to circulation rate, concentration of pollutants and temperature. In practice, in the operation of the system, it is important to arrange that the concentration of pollutants in the liquid streams should reduce progressively between one contacting between one contacting zone and the next in sequence. The concentration of pollutants in the air leaving the final zone will be determined by the concentration of pollutants in the liquid streams and the temperature of the liquid circulating in the final contacting zone.

In the latter connection, when the degree of pollution in the process air is very heavy, it is an advantage of the arrangement according to the invention that the recirculating liquid stream or streams in one or more of the contact zones can be passed through external heat exchangers to cool the liquids and thus lower the equilibrium vapour pressure of volatile constituents. In combination with the low concentration of pollutants in the final contacting zone, a close temperature control may thus be maintained to ensure the substantial absence of pollution in the air finally discharged to the atmosphere.

It will be apparent that the air passing to the contacting device continuously conveys quantities of pollutants, both in particulate and vapour form, which are removed in the various zones of the device and appear as materials dissolved and/or suspended in the recirculating liquid streams. Accordingly, the concentrations of pollutants in the liquid streams tend to increase, making it necessary to maintain a feed of liquid, low in pollutant concentration, so as to control the concentrations of the pollutants in the liquid streams recirculating in the contact zones at suitable levels. A further feature of the invention rests in that the supply of fresh liquid, low in pollutant concentration, can be maintained separately to each of the contact zones. Alternatively, fresh feed may be supplied only to the last contact zone in the operating sequence, displacing a quantity of recirculating liquid from that zone to the preceding one and so on. In this manner there is a net displacement of a liquid effluent from the whole device, which may be controlled as to quantity and pollutant concentration. This liquid effluent can be collected for treatment by known methods, for example by chemical or biological methods, alone or in combination, to produce a treated liquid which may be discharged according to local conditions, or preferably recycled for use in the manufacturing process or for recirculation in the contacting device.

Reference has been made to the contacting zones and to their internal packing whereby the air follows a controlled path and is exposed to a large area of wetted surface, thereby providing the desired operating characteristics for efficient removal of both the particulate and vapour components of the polluting content of the air stream. We have found that the proprietary material known as "Glitsch Grid Packing" is a suitable form of packing for the device, but the invention is not confined to the use of such packing. The requirement is that the packing and internal fitments used shall provide the necessary conditions for acting upon both the particulate and vapour constituents comprising the polluting content of the air, and shall be devised and applied such that the desired removal of pollutants is accomplished with a low energy system.

We have found that with the method according to the invention, special chemical solutions are not required for recirculation in the contact zones, and that water alone is effective. However, according to the formulation of the organic resin binder used in the manufacturing process for the glass fibre products, it may prove advantageous to add a small proportion of a suitable surfactant. Anionic, cationic or non-ionic types of surfactants may be used, as the case may be, to enable the pollutants to be more easily removed from the air passing through the contacting device.

One particular plant for the treatment of polluted air and effluent from a glass fibre product manufacturing line will now be described by way of example and with reference to the accompanying drawings, in which:

FIGS. 1A, 1B and 1C together form a flowsheet for the plant to be described.

The concentration and quantities of pollutants leaving a glass fibre product manufacturing line can vary greatly from day to day and in accordance with changes in the particular product being manufactured and the plant illustrated is intended to be capable of dealing with this situation.

The production line includes the forming conveyor 11 and from this there issues the hot polluted air stream 12. Upon leaving the forming conveyor the product passes through an oven (not shown) maintained at an elevated temperature suitable for curing the phenolic resin binder; fumes are evolved in this curing oven and it is to be understood that the polluted air stream for treatment, as indicated at 12, will ordinarily include these oven fumes as well as the conveyor effluent. Provision also has to be made for washing the conveyor and the conveyor wash liquor can be recirculated from a collecting tank 13 by a pump 14. The polluted air stream 12 passes into an expansion box 15 where it is treated with wash liquor introduced through sprays 16. This serves to remove glass fibres carried over in the air and also lowers the concentration of pollutants from the resin binder. The expansion box wash liquor is collected in a tank 17 and can be recirculated to the sprays 16 by a pump 18.

From the expansion box 15 the air stream passes to the foot of the gas scrubbing column 19. This column comprises three contacting zones 20, 21, 22 up through which the air passes in sequence to leave at 23 at the top of the column. Each zone contains Glitsch Grid packing 24 supported on a baffle plate 24a and has a liquor-collecting tray 25 at its base. The air enters each zone by passing up through the tray 25 by way of chimney risers 26 that project above the tray so as to prevent liquor draining down. The zones 20, 21, 22 have respective sprays 27 for introducing scrubbing liquor at the top of each zone; and the liquor collecting in the trays 25 drains into respective tanks 28 whence it can be recirculated by pumps 29 to the respective sprays 27. The tank 28 associated with the top zone 22 overflows into the tank for the middle zone 21 which in turn overflows into the tank for the bottom zone 20. To control the concentration of the liquor in the scrubbing zones fresh liquor is introduced to the pump feeding the spray of the top zone 22 via a line 30. This causes a proportion of the liquor circulating through the top zone to be displaced into the scrubbing liquor circuit for the middle zone which in turn displaces liquor from the middle zone circuit into the bottom zone circuit. Liquid thus displaced from the bottom zone circuit leaves via a line 31 and a pump 32.

The effluent leaving the pump 32 can flow either via a dilute effluent line 33 direct to a biological treatment unit 34 or via the expansion box and forming conveyor wash liquor circuits to a concentrated effluent line 35 whence it passes through a chemical treatment section 36 for reducing its concentration before it also is delivered into the biological treatment unit 34. The pump 18 in the expansion box wash liquor circuit is able to draw its supply not only from the expansion box wash liquor tank 17 but also from the delivery of the scrubbing liquor effluent pump 32 via a process control valve 37. A further pump 38 draws from the expansion box wash liquor tank 17, and the pump 14 in the forming conveyor wash liquor circuit is able to draw its supply not only from the conveyor wash liquor tank 13 but also from the delivery of the pump 38 via a process control valve 39. A proportion of the concentrated wash liquor in the conveyor wash liquor tank 13 is passed out by a pump 40 to the line 35 via a further process control valve 41.

The proportion of the scrubbing liquor delivery from the pump 32 that passes through the expansion box conveyor wash circuits, as determined by the valve 37, is regulated by a controller for the valve 37 which is responsive to the concentration of the liquor in outflow line 35. The outflow from the expansion box and conveyor wash liquor circuits, via the respective valves 39 and 41, is regulated by controllers for these valves responsive to the levels of the liquors in the expansion box wash liquor tank 17 and the conveyor wash liquor tank 13, respectively.

The concentrated effluent line 35 delivers into a flocculation tank 42 where it is dosed with chemical from a supply tank 43 to cause flocculation and sedimentation of a proportion of the phenolic contents. The chemicals used can be ferric sulphate together with a polyelectrolyte flocculation to promote the rapid formation of large flocs, and lime to adjust the pH value to 7.5–8.0. The liquor and sediment from the bottom of the tank 42 is pumped by a pump 44 to a rotary filter 45. The filtrate liquor passes to a tank 46; and any supernatant liquor overflowing from the tank 42 is passed direct into the tank 46. A pump 47 withdraws liquid from the tank 46 and delivers a proportion into the biological treatment unit 34, via a process control valve 48, where it joins the dilute effluent from the line 33. The remainder of the delivery of the pump 47 flows away in the line 49 for use in mixing the resin binder for the manufacturing process.

The biological unit 34 is of the activated sludge type employing aeration, the air being introduced at 50, e.g. through submerged diffusers. The material from this unit is delivered into a sludge settling tank 51 whence the sludge is pumped by a pump 53 to a rotary filter 52 the filtrate being returned to the settling tank. A pump 54 withdraws the clear supernatant liquor from the tank 51 and returns it to the scrubbing column 19 via the line 30.

Since there is a net loss of water from the system by evaporation and by withdrawal for use in mixing of the resin binder, fresh make-up water is added from a line 55 into the biological treatment unit 34 via a control valve 56 and also into the settling tank 51 via a control valve 57. This assists in bringing the liquor concentration in the biological unit into the best range for treatment. The fresh water flow into the biological unit 34 is regulated by a controller for the valve 56 which is responsive to the concentration of the liquor entering this unit. This controller also regulates the delivery of dosing chemical into the flocculation tank 42 by means of a control valve 58. The fresh water flow into the settling tank 51 is determined by a controller for the valve 57 which responds to the level of the liquor in that tank.

The valve 48 determining the delivery from the tank 46 into the biological treatment unit is regulated in accordance with the level in the tank 46.

The main flow volume is determined by the fresh feed rate to the gas scrubbing column which reappears as effluent from the column with a phenolic concentration not exceeding about 1,100 p.p.m. This stream branches as described, the minor part passing to the expansion box and conveyor wash liquor circuits. The concentration of the liquor leaving these circuits is monitored and maintained at, say 3000 p.p.m. by blending in, as required, the more dilute scrubbing tower effluent. The addition of a volume of scrubbing effluent displaces an equivalent volume of expansion box and conveyor wash liquor at the controlled concentration of 3000 p.p.m. This concentrated liquor is subject to chemical treatment to reduce its concentration to, say, 1500 p.p.m. before it rejoins the main stream of the scrubbing column effluent at the inflow to the biological treatment plant.

To keep the concentration of phenols entering the biological unit at a desirable low level it may be advantageous to make the hydraulic capacity of the plant greater than the fresh feed flow rate required by the scrubber. This enables a stream of treated effluent at very low concentration to by-pass the scrubber and be available for dilution of the stream entering the biological unit. Alternatively, the feed rate to the scrubber can be increased with corresponding reduction in the phenolic concentration of the scrubber effluent.

The system described enables the operating conditions of the scrubber column to be held substantially steady by making other process adjustments. For instance, a higher load of phenols in the polluted air stream can be dealt with by changing the concentration of the expansion box liquor rather than by changing the flows of the column itself.

If the column were operated alone it would have a considerable water consumption and there would be the problem of disposing of the liquid effluent. But in the system as described the total water usage is reduced by condensation from the air stream in the column and there is no liquid effluent disposal problem at all. The only wastes for disposal are the cake from the chemical treatment plant filter 45 and the cake or sludge from the biological plant filter 52.

We claim:
1. A method for the removal of phenolic air pollutants in the production of glass fibre products, wherein the polluted air is passed sequentially through at least two low energy contacting zones in each of which it is contacted with descending scrubbing liquor, each succeeding contacting zone having at its bottom individual liquor collecting means, and in passing from one contacting zone to the next zone the air stream undergoes acceleration in a transfer passage in which no inter-zone flow of liquor occurs and then impinges on baffle means disposed in its path as it enters said next zone at a level above the pool of scrubbing liquor collected at the bottom of said next zone in said liquor collecting means.

2. A method according to claim 1, wherein the contacting zones are of columnar form with scrubbing liquor passing down and the air stream passing up in countercurrent through means providing a high ratio of wetted surface area to air flow, the scrubbing liquor collected at the bottom of each contacting zone being at least partially recirculated to spray means at the top of the same zone.

3. A method according to claim 1, wherein there are at least three contacting zones disposed in a single column one above the other, and the air stream in passing up from one zone into the next above rises through an accelerating flow riser passage of reduced cross section above which transverse baffle means is disposed so that the accelerated air stream emerging from the reduced flow riser passage impinges on and is deflected by the baffle means whereby it is brought into contact with scrubbing liquor cascading down from the edges of the baffle means.

4. A method according to claim 2, wherein the scrubbing liquor recirculating through each contacting zone has fresh liquor added to it which displaces an equivalent quantity of the recirculating liquor, thereby to control the concentration of pollutants in the recirculating liquor.

5. A method according to claim 4, wherein fresh scrubbing liquor is added to the liquor recirculating through the last contacting zone in the sequence of contacting zones and thereby displaces liquor from the recirculating liquor of the last zone into the liquor recirculating in the last but one contacting zone, and so on through the sequence of zones, the final effluent displaced from the liquor recirculating through the first zone in the sequence being led away to a different treatment elsewhere.

6. A method according to claim 5, wherein the scrubbing liquor is basically water.

7. A method according to claim 6, wherein at least a portion of the final effluent displaced from the liquor recirculating in the first contacting zone is employed as wash liquor for items of plant in the glass fibre production line before being led away to effluent liquor treatment plant.

8. A method according to claim 2, wherein the recirculating scrubbing liquor of at least one of the contacting zones is passed, externally of said zone, through a heat exchanger whereby it is cooled.

References Cited

UNITED STATES PATENTS

| | | | |
|---|---|---|---|
| 2,718,275 | 9/1955 | Banks | 55—93 |
| 2,720,280 | 10/1955 | Doyle | 55—93 |
| 2,838,135 | 6/1958 | Pilo et al. | 55—94 |
| 2,972,393 | 2/1961 | Bush | 55—89 |
| 3,191,916 | 6/1965 | Kurpit et al. | 55—89 |
| 3,370,402 | 2/1968 | Nakai et al. | 55—94 |

OTHER REFERENCES

The Condensed Chemical Dictionary, sixth ed., Reinhold Press, N.Y., p. 875.

SAMIH N. ZAHARNA, Primary Examiner

C. N. HART, Assistant Examiner

U.S. Cl. X.R.

55—94